US008740399B2

(12) United States Patent
Wang

(10) Patent No.: US 8,740,399 B2
(45) Date of Patent: Jun. 3, 2014

(54) TOUCH TYPE LAMP SWITCH

(76) Inventor: David Wang, New Taipei (TW)

( * ) Notice: Subject to any disclaimer, the term of this patent is extended or adjusted under 35 U.S.C. 154(b) by 325 days.

(21) Appl. No.: 13/100,182

(22) Filed: May 3, 2011

(65) Prior Publication Data

US 2012/0279840 A1 Nov. 8, 2012

(51) Int. Cl.
*G01D 11/28* (2006.01)

(52) U.S. Cl.
USPC ........ 362/23.04; 362/23.05; 362/95; 200/313

(58) Field of Classification Search
USPC ............... 200/313–315; 362/23.04, 23.05, 95
See application file for complete search history.

(56) References Cited

U.S. PATENT DOCUMENTS 7,432,463 B2 * 10/2008 Clegg et al. .................. 200/314
8,205,997 B2 * 6/2012 Wu et al. ......................... 362/95

* cited by examiner

*Primary Examiner* — Stephen F Husar
(74) *Attorney, Agent, or Firm* — Alexander Chen

(57) ABSTRACT

A touch type lamp switch, which comprising: an upper and lower casing matched to each other; a keying zone is protruded integrally on the upper casing, and several touch switches are divided; multiple punch holes are arranged on the periphery of the keying zone, and the lower casing is provided with a depressed space, with its opening interlocked with the upper casing; a faceplate, attached firmly onto the upper casing; a transparent light panel, attached firmly with the surface of the faceplate; a rectangular hollow frame, embedded onto the center of the transparent light panel and faceplate for locking the transparent light panel; and a circuit structure, embedded into the space formed by the upper and lower casings, comprising of touch switch circuit, several LED indicators and colorful LED backlight.

8 Claims, 7 Drawing Sheets

TOUCH TYPE LAMP SWITCH

BACKGROUND OF INVENTION

1. Field of the Invention

The present invention relates generally to an improved lamp switch, and more particularly to a touch type which is designed with touch control of the lamp's switching-on/-off along with LED indicator and backlight color control.

2. Description of Related Art

Lamp switches are commonly used in everyday family life and also onto some electric appliances for indoor and outdoor applications, allowing users to turn on/off lightings or electric appliances; however, such lamp switch is often a mechanical switch used to conductively turn on/off lightings via the contact of metal springs.

The aforementioned common lamp switch is of practical value; however, the following shortcomings are observed during actual applications:

1. A conventional lamp switch is often fitted with elastic parts, allowing for turning on/off mechanically; the elastic parts may lead to elastic fatigue or loosening under long-lasting pressing pressure of fingers, or tripping in the event of inaccurate point of applied force, or even failure or malfunction in the event of insufficient applied force.
2. A conventional lamp switch is structurally designed in a way that many parts are assembled in a time-consuming manner; in particular, the gap between faceplate and keys makes it vulnerable to dirtiness.
3. Owing to the gap between the lamp switch's faceplate and keys, the keys are often protruded out of the faceplate, resulting possibly in accidental scratching or scoring, or even safety hazards arising from electric shock in the case of contact with wet hands.
4. The faceplate and keys of conventional lamp switch are generally designed into a fixed pattern, but such dull and rigid design cannot make indoor environment aesthetically pleasing.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

SUMMARY OF THE INVENTION

The primary objective of the present invention is to provide a touch type lamp switch, which is operated by means of touch to control the lamp's on/off, enabling ease of operation to improve the living standard.

The second objective of the present invention is to provide a touch type lamp switch, which allows to combine the touch switch with electronic modules for easier assembly; meanwhile, irrespective of the number of touch switches assembled onto the faceplate, the parts of the same dimension can be fully interchanged to reduce extra molding cost for the economic benefits.

The third objective of the present invention is to provide a touch type lamp switch, which allows to design integrally the faceplate and touch switch, so as to reduce dirtiness and avoid accidental electric shock for higher safety.

The fourth objective of the present invention is to provide a touch type lamp switch, which permits the users to determine the color of rear panel and create colorful backlit scenario based on aesthetic design, thus beautifying indoor decorative space and bringing about a fashion sense.

A touch type lamp switch is designed, which comprising: an upper and lower casing matched to each other; a keying zone is protruded integrally on the upper casing, and several touch switches are divided and meshed with the lower casing with a depressed space at the other side of the keying zone; a faceplate, attached firmly onto the upper casing; a transparent light panel, attached firmly onto the surface of the faceplate; a rectangular hollow frame, embedded centrally into the transparent light panel and faceplate, so as to snap the transparent light panel; and a circuit structure, embedded into the space formed by the upper and lower casings, and comprising of touch switch circuit, several LED indicators and colorful LED backlight, so as to provide touch control, status display and backlighting effects.

As for said touch type lamp switch, at least one protruding line or slot of different shapes is set onto the surface of the keying zone, or several touch switches are divided through screen printing. Either screen print or protruding line and slot can be designed into a linear, arched pattern or a geometrical pattern or the combination of geometrical patterns.

As for said touch type lamp switch, every touch switch is properly provided with a through-hole, enabling status display by optical radiation when LED indicator is highlighted.

As for said touch type lamp switch, multiple punch holes are arranged on the periphery of the keying zone, enabling backlighting by optical radiation when colorful LED backlight is highlighted.

As for said touch type lamp switch, the touch switch circuit is of a capacitance, resistance or IR touch control type.

As for said touch type lamp switch, the colorful LED backlight is available for colorful backlighting function, allowing the users to determine the color of switch's rear panel and create colorful backlit scenario according to their mood; the chips in the circuit structure are used to control the color change of LED indicator, and determine the selection of light colors by different keys: 64-level color selection and separate level adjustment of RGB key with internal setting: R key, red: 16-level color; G key, green: 16-level color; B key, blue: 16-level color.

As for said touch type lamp switch, the LED indicators also consist of action indicator and touch indicator.

As for said touch type lamp switch, the colorful LED backlight is highlighted constantly to provide backlighting effect for the lamp switch, or change automatically the color once the touch switch is pressed by the operator.

The features of the present invention will be more readily understood upon a thoughtful deliberation of the following detailed description of a preferred embodiment of the present invention with reference to the accompanying drawings.

DETAILED DESCRIPTION OF THE INVENTION

Referring to FIG. 1, an external view of a preferred embodiment of the touch type lamp switch of the present invention illustrates the lamp switch 1 with three switch assemblies; referring also to FIG. 2, the lamp switch 1 can be fabricated into one or more touch switches 103 (e.g.: 2, 3 or 4), and the surface of the upper casing 10 is only required to be divided simply for this purpose; so the higher interchangeability of parts makes it possible to reduce the molding cost for higher economic benefits.

Referring also to FIGS. 3, 4—an exploded view and a partially enlarged view of the touch type lamp switch, the lamp switch 1 comprises: an upper and lower casing 10, 11 matched to each other; a faceplate 20, attached firmly onto the upper casing, 10; a transparent light panel 30, attached firmly onto the surface of the faceplate 20; and a circuit structure 40, embedded into the space formed by the upper and lower casings.

The upper casing, 10 is of a rectangular plate, from the center of which a keying zone 101 is protruded; the keying zone 101 is divided into several touch switches 103 by at least one protruding line (or slot) 102 of different shapes (e.g.: linear, arched pattern or a geometrical pattern or the combination of geometrical patterns) (or by means of screen printing); every touch switch 103 is properly provided with a through-hole 104, so that the rays of the corresponding LED indicator can be emitted from the through-hole 104, showing the standby/service state of the touch switch 103; multiple punch holes 105 are arranged on the periphery of the keying zone 101, enabling backlighting by optical radiation when the colorful LED backlight is highlighted; a plurality of caulking grooves 106 is set at two sides of the depressed zone in the keying zone 101, so as to position securely the lower casing 11; a depressed holding space 111 is set onto the lower casing 11, and also separated with a wiring zone 112; and, a plurality of cogs 113 is set at any two sides on the opening of the holding space 111, allowing to embed into the corresponding caulking groove 106 in the upper casing 10;

The faceplate 20 is a flat plate of certain thickness, which can be attached firmly with the upper casing 10; an empty slot 21 allowing for sealed penetration of the keying zone 101 is set at the center of the faceplate 20; several stepped snappers 22 of certain length are arranged onto the surface around the empty slot 21, while notched slots 23 of the same length are set adjacent to the stepped snappers 22 (far from the empty slot), permitting to fit tightly the periphery of the keying zone 101 onto the rectangular hollow frame 24; several composite bulges 241 of certain length are also set at one surface of the frame 24; the composite bulge 241 is composed of an upper and a lower bulge, between which there is a gap; when the frame 24 is coupled with the faceplate 20, the upper bulge of the composite bulge 241 can be embedded into the notched slot 23, and lower bulge attached to the stepped surface of the stepped snapper 22; the top of the stepped snapper 22 is embedded into the gap between the upper and lower bulges of the composite bulge 241; moreover, several salient points 211 are properly set onto the inner surface of the periphery of the empty slot 21, and extended into corresponding small holes 107 on the periphery of the keying zone 101 for snapping and positioning to ensure tight engagement of the faceplate 20 and the upper casing 10;

The transparent light panel 30 is a transparent panel of certain thickness, which is attached firmly with the surface of the faceplate 20; a groove 31 allowing for penetration of the keying zone 101 is set at the center of the transparent light panel 30; when the transparent light panel 30 is attached onto the faceplate 20, the engagement of the frame 24 with the faceplate 20 enables secure snapping of the transparent light panel 30;

The circuit structure 40 (not shown in the figure) is embedded into the space formed by the upper and lower casings 10, 11, which comprising: a touch switch circuit aligned with said keying zone 101; the touch circuit is of a capacitance, resistance or IR touch control type. Its operating principle is that, after manual touch by the operator, the touch switch circuit is used to sense the change of current, resistance or IR shielding, so as to control on/off of the current and the lamp; with this design, when a finger touches any touch switch 103 within the keying zone 101, the corresponding touch circuit could detect the change of current, resistance or IR shielding, so as to control on/off of specific lamp; several LED indicators, aligned separately with the through-holes 104 of several touch switches 103 separated by said keying zone 101, so as to show current status (standby or service); and colorful LED backlight with backlighting functions, enabling the chips in the circuit structure 40 to control the color change of LED indicator, adjust the brightness from full brightness to extinguishing, and determine the selection of light color by different keys: 64-level color selection and separate level adjustment of RUB key with internal setting: R key, red: 16-level color; G key, green: 16-level color; B key, blue: 16-level color. Automatic color change is possible when any touch switch 103 in the keying zone 101 is touched by the operator.

Moreover, the LED indicators also consist of action indicator and touch indicator, of which the action indicator is highlighted constantly in idle state, and extinguished when any touch switch 103 in the keying zone 101 is touched by finger; meanwhile, the touch indicator is highlighted, indicating that the touch switch 103 is actually triggered to highlight controlled lamp, so as to remove abnormal touch control.

Additionally, the colorful LED backlight is also used to adjust brightness, and four-stage control from full brightness to extinguishing is conducted by the chips in the circuit structure to provide backlighting effect of the lamp switch 1; this allows to change automatically the color once the touch switch 103 is pressed by the operator, such that the color light will be emitted from the punch holes 105 on the periphery of the keying zone 101 to the transparent light panel 30, realizing changeable backlighting effect.

The wiring diagram of said touch type lamp switch is illustrated in FIG. 5, wherein a lamp switch with three switch assemblies is provided in the preferred embodiment. As the wiring method for at least one or more switches can be easily or freely controlled by those skilled in art, the description of this case is neglected herein. In the event of idle state after assembly, the color light of LED indicator will be emitted from the through-hole 104 of any touch switch 103 in the keying zone 101, thus enabling convenient display and search by the users in the night.

Referring also to FIG. 6, when the users intend to turn on the lamp, the indicating ray emitted from the through-hole 104 on the touch switch 103 will be extinguished once any touch switch 103 in the keying zone 101 is touched by finger, and then specific lamp will be highlighted; meanwhile, the touch indicator in the keying zone 101 will be highlighted simultaneously to remove abnormal touch control. When the users intend to turn off the lamp, this can be realized by repetitive touch. In addition, the colorful LED backlight will be highlighted and its color is changed according to the preset 64-level color, once the touch switch 103 in the keying zone 101 is pressed.

Referring also to FIG. 7—a view of another preferred embodiment of the touch type lamp switch, wherein the effect of the touch indicator could be neglected to control manually the colorful LED backlight; in actual operation, RGB functional keys for manual control of backlighting are set correspondingly at the keying zone 101, so the users may touch manually RGB functional keys to change directly the backlight color depending on personal preferences and characteristics.

The conventional lamp switch could be touched to control the lamp's on/off, helping to realize convenient operation and improve living standard in tune with technological progress; as for manufacturing, the touch switch is designed to match the electronic modules, so as to minimize the parts for easier assembly; on the other hand, the unique integrated design of faceplate and touch switch could reduce the foreign materials and avoid accidental electric shock for higher safety; meanwhile, the aesthetics design could save space and create beautiful and fashionable indoor decorations via automatic or manual control of 64-level backlighting effect.

Although the invention has been explained in relation to its preferred embodiment, it is to be understood that many other possible modifications and variations can be made without departing from the spirit and scope of the invention as hereinafter claimed.

Figure 1:
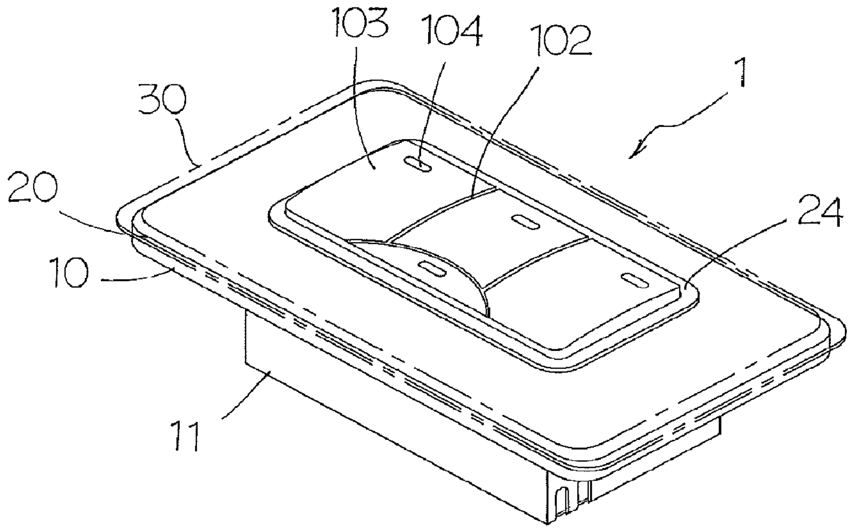
FIG. 1: an external view of touch type lamp switch in a preferred embodiment of the present invention.
Figure 2:
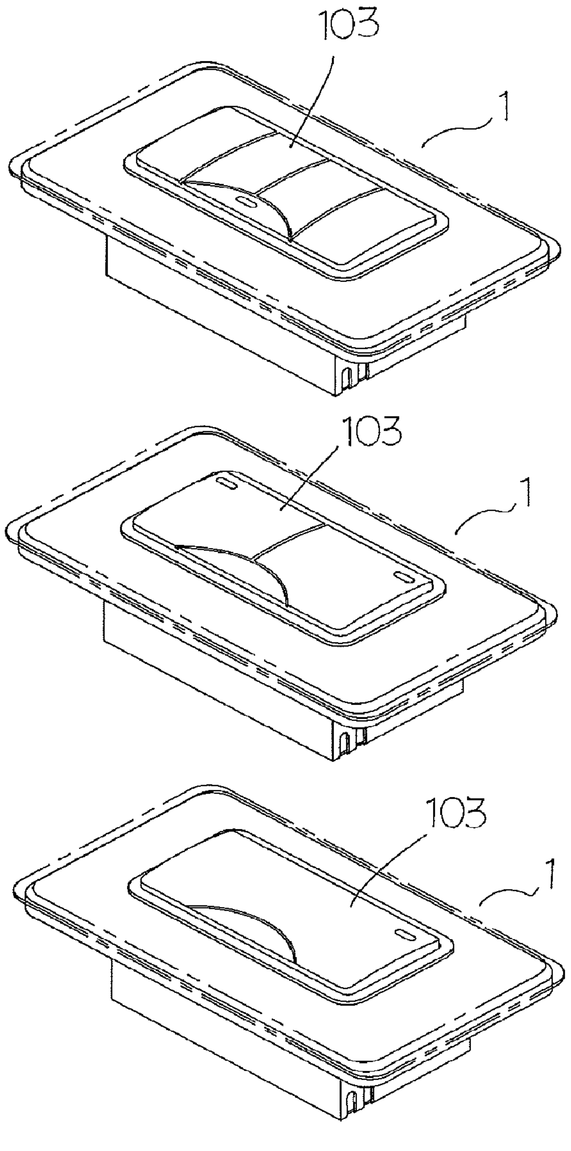
FIG. 2: an external view of touch type lamp switch with different patterns in a preferred embodiment of the present invention.
Figure 3:
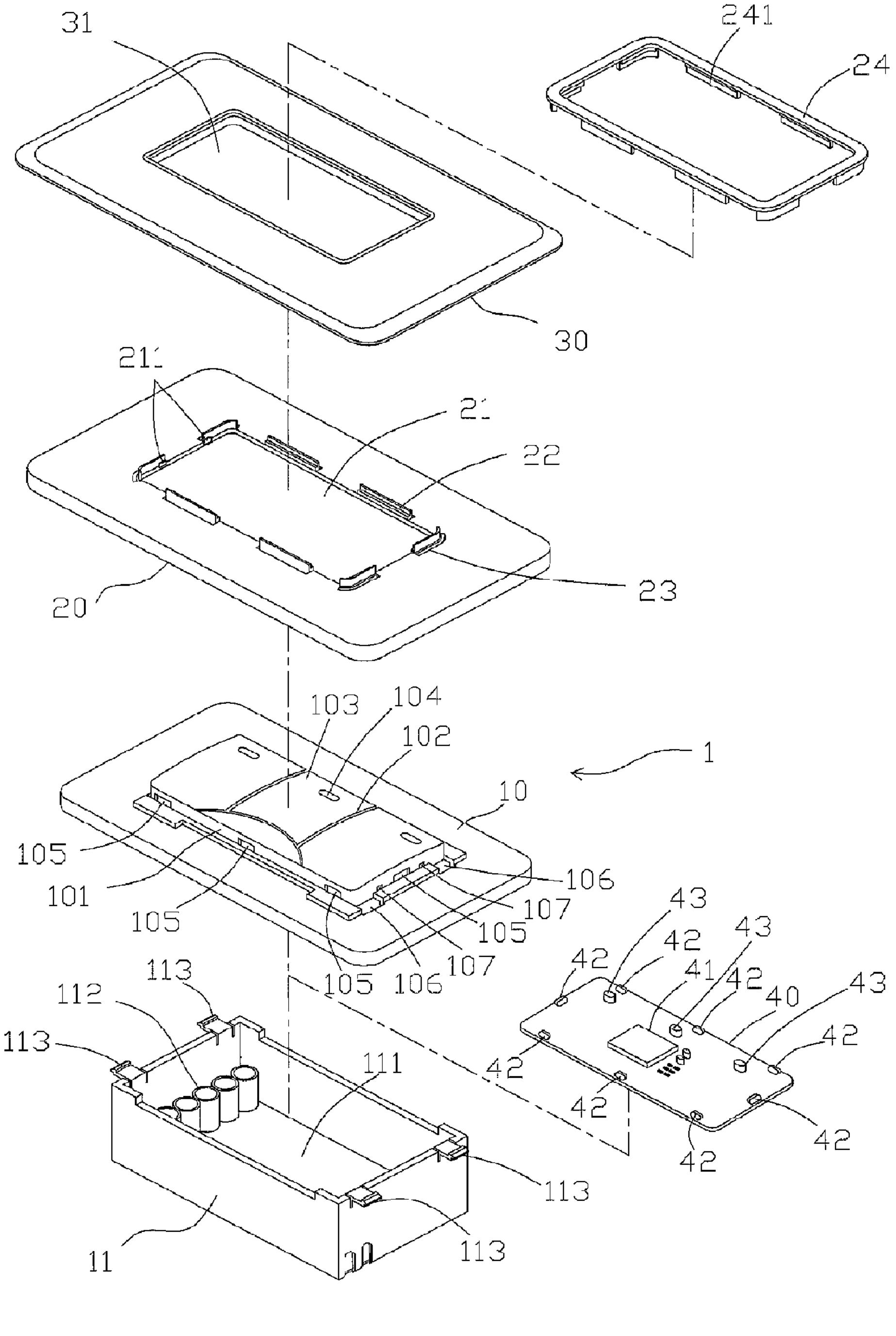
FIG. 3: an exploded view of touch type lamp switch in a preferred embodiment of the present invention.
Figure 4:
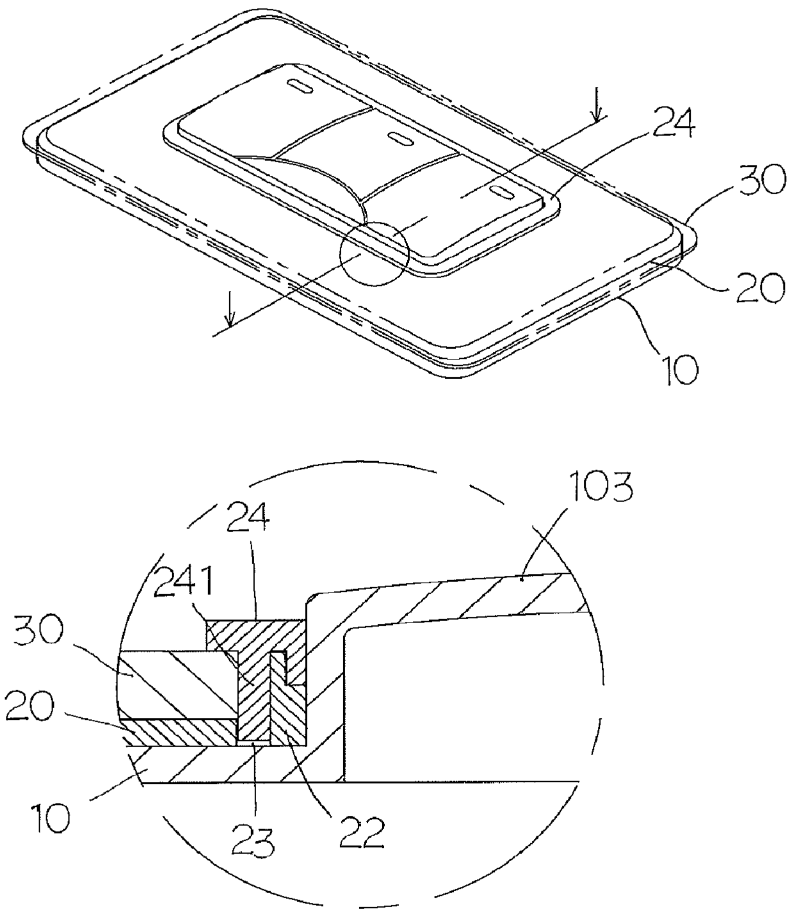
FIG. 4: a sectional & partially enlarged view of touch type lamp switch in a preferred embodiment of the present invention.
Figure 5:
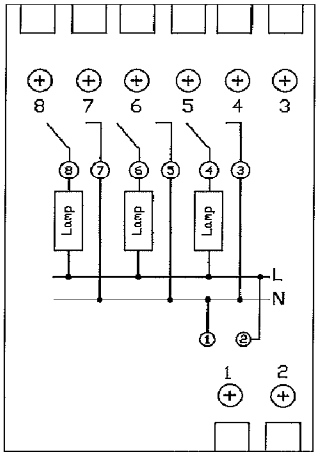
FIG. 5: a roadmap of touch type lamp switch in a preferred embodiment of the present invention.
Figure 5:
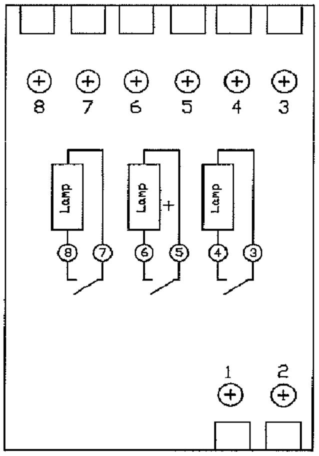
Figure 6:
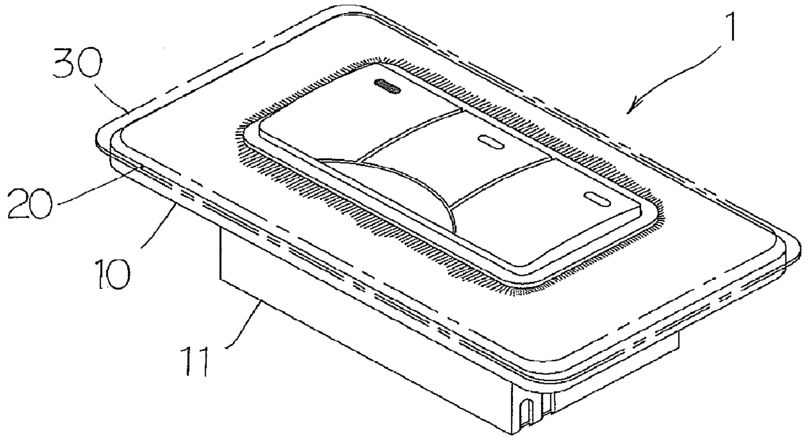
FIG. 6: a status view of touch type lamp switch in a preferred embodiment of the present invention.
Figure 7:
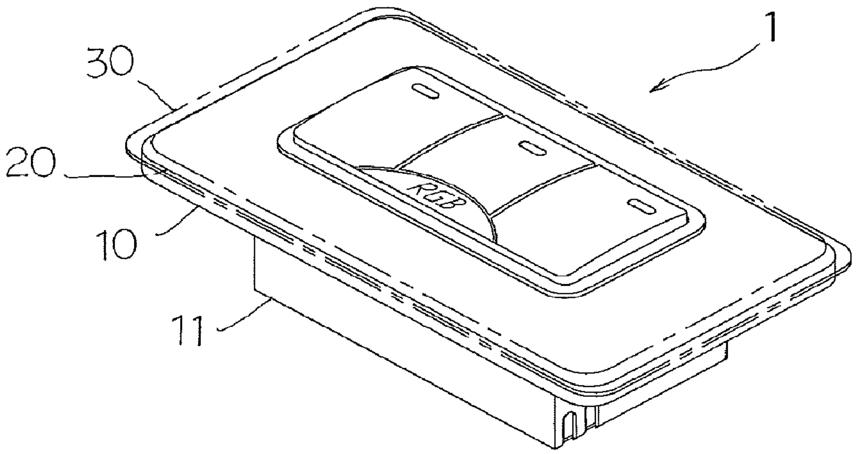
FIG. 7: an external view of touch type lamp switch in another preferred embodiment of the present invention.

The invention claimed is:

1. A touch type lamp switch, which comprising:

an upper and lower casing matched to each other; a keying zone is protruded integrally on the upper casing, and several touch switches are divided; multiple punch holes are arranged on the periphery of the keying zone, and the lower casing is provided with a depressed space, with its opening interlocked with the upper casing; a faceplate, attached firmly onto the upper casing; an empty slot allowing for sealed penetration of the keying zone is set at the center of the faceplate; a transparent light panel, attached firmly with the surface of the faceplate, and a groove allowing for penetration of the keying zone is set at the center of the transparent light panel;

a rectangular hollow frame, embedded onto the periphery of the groove at center of the transparent light panel, so as to snap onto the periphery of the faceplate's empty slot for locking the transparent light panel, and a circuit structure, embedded into the space formed by the upper and lower casings so as to provide touch control, status display and backlighting effects.

2. The touch type lamp switch as claimed in claim 1, wherein at least one protruding line or slot of different shapes is set onto the surface of said keying zone, or several touch switches are divided through screen printing.

3. The touch type lamp switch as claimed in claim 2, wherein said slot can be designed into a linear, arched pattern or a geometrical pattern or the combination of geometrical patterns.

4. The touch type lamp switch as claimed in claim 1, wherein every touch switch is properly provided with a through-hole, enabling status display of the rays when LED indicator is highlighted.

5. The touch type lamp switch as claimed in claim 1, wherein multiple punch holes are arranged on the periphery of the keying zone, enabling backlighting by optical radiation when the colorful LED backlight is highlighted.

6. The touch type lamp switch as claimed in claim 1, wherein a plurality of caulking grooves is set at two sides of the depressed zone in the keying zone on the upper casing, and a plurality of cogs is set at any two sides on the opening of the holding space of the lower casing, allowing to embed into the corresponding caulking groove.

7. The touch type lamp switch as claimed in claim 1, wherein several stepped snappers of certain length are arranged onto the surface around the empty slot of the faceplate, while notched slots of the same length are set adjacent to the stepped snappers; several composite bulges of certain length are also set at one surface of the frame; the composite bulge is composed of an upper and a lower bulge, between which there is a gap; when the frame is coupled with the faceplate, the upper bulge of the composite bulge can be embedded into the notched slot, and lower bulge attached to the stepped surface of the stepped snapper; the top of the stepped snapper is embedded into the gap between the upper and lower bulges of the composite bulge.

8. The touch type lamp switch as claimed in claim 1, wherein several salient points are properly set onto the inner surface of the periphery of the empty slot, and extended into corresponding small holes on the periphery of the keying zone for snapping and positioning.

* * * * *